(12) United States Patent
Priti et al.

(10) Patent No.: US 8,228,993 B2
(45) Date of Patent: Jul. 24, 2012

(54) SYSTEM AND METHOD FOR ENCODING AND DECODING INFORMATION IN DIGITAL SIGNAL CONTENT

(76) Inventors: Shalini Priti, St. Louis, MO (US); Joseph A. O'Sullivan, St. Louis, MO (US)

( * ) Notice: Subject to any disclaimer, the term of this patent is extended or adjusted under 35 U.S.C. 154(b) by 1087 days.

(21) Appl. No.: 12/098,794

(22) Filed: Apr. 7, 2008

(65) Prior Publication Data

US 2010/0002769 A1  Jan. 7, 2010

Related U.S. Application Data

(60) Provisional application No. 60/922,088, filed on Apr. 6, 2007.

(51) Int. Cl.
*H04N 7/12* (2006.01)
(52) U.S. Cl. ............. 375/240.18; 375/240; 375/240.01; 375/240.08
(58) Field of Classification Search .................. 375/240, 375/240.01–240.03, 240.08, 240.12, 240.16, 375/240.18, 240.19, 240.2
See application file for complete search history.

(56) References Cited

U.S. PATENT DOCUMENTS

| | | | | |
|---|---|---|---|---|
| 5,455,629 A * | 10/1995 | Sun et al. | ................. | 375/240.27 |
| 5,831,688 A * | 11/1998 | Yamada et al. | ............... | 348/699 |
| 6,366,705 B1 * | 4/2002 | Chiu et al. | .................... | 382/239 |
| 2002/0085635 A1 * | 7/2002 | Kim et al. | ................ | 375/240.05 |
| 2003/0072370 A1 * | 4/2003 | Girod et al. | ............. | 375/240.13 |
| 2005/0031034 A1 * | 2/2005 | Kamaci et al. | ........... | 375/240.03 |
| 2006/0088222 A1 * | 4/2006 | Han et al. | ..................... | 382/232 |
| 2007/0116125 A1 * | 5/2007 | Wada et al. | ............... | 375/240.16 |
| 2007/0223693 A1 * | 9/2007 | Van Leest | ..................... | 380/210 |
| 2008/0123733 A1 * | 5/2008 | Yu et al. | .................... | 375/240.01 |
| 2009/0257511 A1 * | 10/2009 | Jeong et al. | ............. | 375/240.25 |

* cited by examiner

*Primary Examiner* — Kwang B Yao
*Assistant Examiner* — Nguyen Ngo
(74) *Attorney, Agent, or Firm* — Clise, Billion & Cyr, P.A.; Timothy B. Clise

(57) ABSTRACT

Systems and methods for embedding and extracting data in a digital signal content are disclosed. In the various embodiments, a system includes a processing unit configured to receive the digital signal content and the data, and an encoder configured to embed the data into the digital signal content. In other of the various embodiments, a system includes a processing unit configured to receive a digital signal content having embedded data, and a decoder configured to extract the data from the digital signal content.

28 Claims, 7 Drawing Sheets

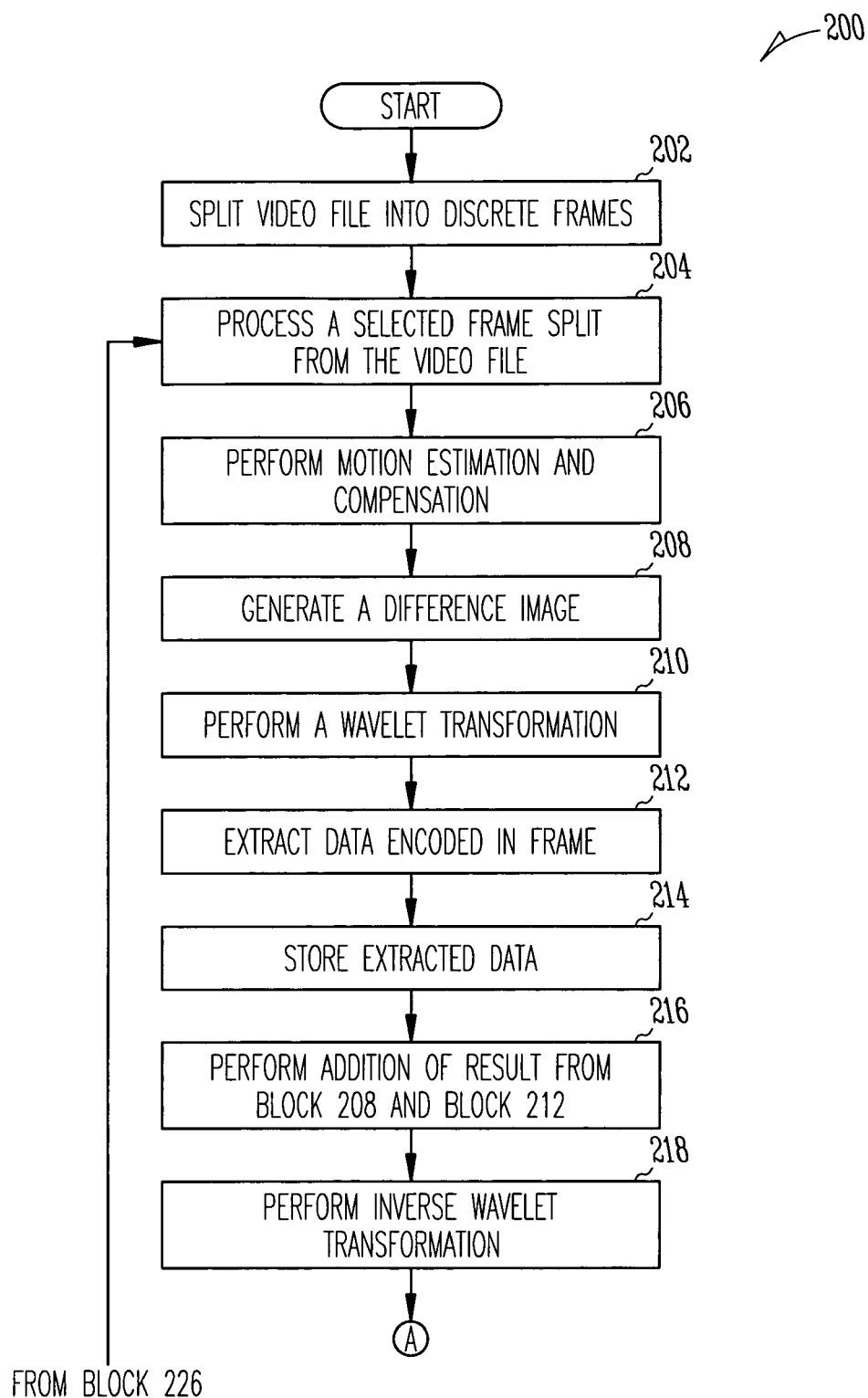

SYSTEM AND METHOD FOR ENCODING AND DECODING INFORMATION IN DIGITAL SIGNAL CONTENT

RELATED APPLICATIONS

This patent application claims the benefit of priority, under 35 U.S.C. Section 119(e), to U.S. Provisional Patent Application Ser. No. 60/922,088, filed on Apr. 6, 2007, which is incorporated herein by reference in its entirety.

FIELD

The present application relates generally to the technical field of signal-processing and, in one specific example, to a method and system for encoding and decoding information in a digital signal content.

BACKGROUND

Undesired alteration of digital images is complicated due to the relative ease with which the digital image may be reproduced and distributed. Secure communication methods, such as various encryption methods, provide one form of protection for digital images. Briefly, and in general terms, encryption may prevent outsiders from viewing the digital image or video sequence, but once the image or video stream has been decrypted, all protection against manipulation and redistribution of the image or video stream are eliminated. Moreover, if it is desired to distribute the digital image or video sequence on a widespread basis, management of the encryption key in a public key encryption scheme may become cumbersome. In addition, since encryption generally requires error-free communications, distribution of the digital image or video stream may not be available in all networks, particularly wireless networks.

An alternative method for preventing undesired alteration of digital images may be provided by a message authentication code that may be attached to the digital image. For example, in one known method, origination information may appear within a message field appended to the digital image. One significant shortcoming present in this type of add-on authentication is that it is easily identified and removed from the digital image. A more resilient system may be provided by selectively encoding data into the digital image that is generally not perceptible to a viewer.

Digital marking is one known method for providing an identifier in a digital image. Typically, a digital mark is unobtrusively embedded in the image so that an attempted removal of the digital mark generally destroys the underlying digital image. The mark may further be embedded into the original data so that it is generally imperceptible to a viewer. Accordingly, when suitably marked digital signal content is distributed to others, the data included within the mark is distributed with the digital signal content, so that the originator can non-ambiguously demonstrate the source of the content. Digital marking may also permit tampering to be identified, since any manipulation of the data within the mark will result in an invalid mark.

A variety of conventional digital marking methods have been proposed. Typically, these digital marking methods insert a digital mark into the high-frequency content of an image or other product. Although marginally effective with respect to some types of attacks, the conventional digital marking methods are vulnerable if techniques such as low-pass filtering are used. In addition, the conventional digital marking methods tend to be labor-intensive, relatively slow, and lack the ability to be adequately automated.

BRIEF DESCRIPTION OF THE DRAWINGS

Various embodiments are described in detail below with reference to the following drawings.

DETAILED DESCRIPTION

Various embodiments include methods and systems for encoding and decoding information in a video signal. Many specific details of the various embodiments are set forth in the following description and in FIGS. 1 through 6 to provide a thorough understanding of such embodiments. One of ordinary skill in the art, however, will understand that additional embodiments are possible, and that many embodiments may be practiced without several of the details described in the following description. In the description that follows, it is understood that the content signal may include a sequence of images (e.g., frames) and optionally associated audio. Examples of the content signal include standard definition (SD) and/or high definition (HD) content signals in NTSC (National Television Standards Committee), PAL (Phase Alternation Line) or SECAM (Systeme Electronique Couleur Avec Memoire), a MPEG (Moving Picture Experts Group) signal, a sequence of JPEGs (Joint Photographic Experts Group), a sequence of bitmaps, or other signal formats that transport a sequence of images. The form of the content signal may be modified to enable implementations involving the content signals of various formats and resolutions.

Figure 1:
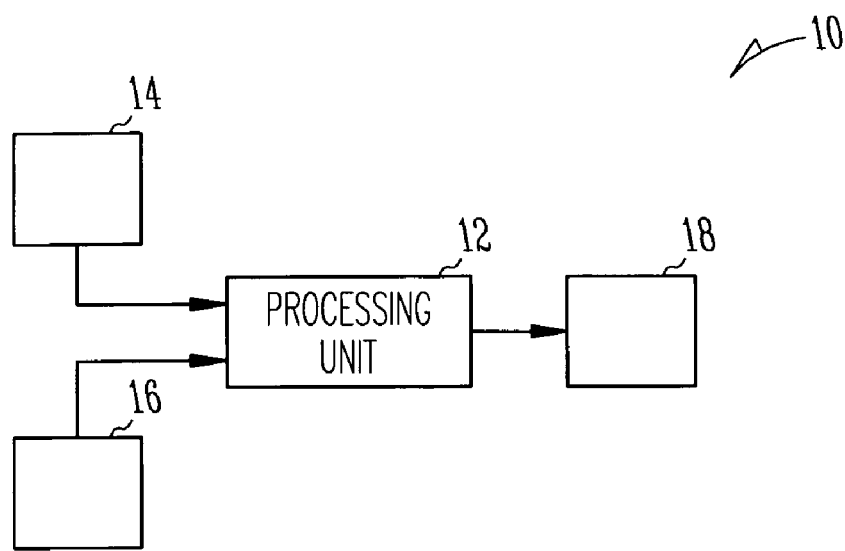
FIG. 1 is a diagrammatic block view of a processing system according to the various embodiments.

FIG. 1 is a diagrammatic block view of a processing system 10 according to the various embodiments. The processing system 10 includes a processing unit 12, which may include any general purpose programmable computational device that is configured to receive programming instructions and data, and to process the received data according to the programming instructions. Accordingly, the processing unit 12 may include a mainframe computational device, or it may include a portable device, such as a "laptop" device. The processing unit 12 may also include a plurality of processing units that are coupled through a network so that information processing is shared between the plurality of processing units. The processing unit 12 may be configured to receive a content signal 14, which may include a digital video file that includes a plurality of video frames. For example, the digital video file may include a video file that is formatted according to a standardized format, such as the well-known MPEG format. Accordingly, the content signal 14 may be provided to the processing unit 12 from a storage device (not shown) that is operably coupled to the processing unit 12. Alternately, the content signal 14 may be provided to the processing unit 12 by other means, as one skilled in the art will readily appreciate.

The processing unit 12 may also be configured to receive supplemental data 16 that that may be encoded into the content signal 14 using an encoding apparatus that is provided by the processing unit 12, which will be described in greater detail below. Briefly, and in general terms, the encoding apparatus, in conjunction with the processing unit 12 is configured to generate an encoded content signal 18 that includes the supplemental data, in either a perceptible or a non-perceptible form. The encoded content signal 18 may then be transferred to other processing units by means of a suitable communications system that is coupled to the processing unit 12 (not shown), or to a storage device coupled to the processing unit 12 (also not shown). The encoding apparatus may be implemented in hardware, in firmware, partially in software, or entirely in software.

The supplemental data 16 may include a mark that may be selectively modulated within a content signal 14 by the encoding apparatus for signaling purposes. The mark may generally include a non-data carrying signal that may be embedded in an active portion of the content signal. For example, the active portion may include a perceptible portion of the content signal, which may be interspersed between generally non-perceptible (e.g., blank), or inactive portions of the content signal. In the various embodiments, the mark may include a non-data carrying signal that it is not plural or multi-bit, and/or not a random, pseudo random or other noise-like signal that may not be driven by a defined algorithm. Instead, the non-data signal may include a defined/static signal. The non-data carrying signal may not be encoded at or below the noise floor, so that it is generally above the noise floor. The non-data carrying signal may not be a steganographic signal.

The mark may be embedded within the content signal 14 to indicate that various proprietary rights are associated with content signal 14, although other implementations of the mark are also contemplated. Upon suitable modulation of the content signal, the encoding apparatus of the processing unit 12 may output a modulated content signal that includes a content signal and a mark. Methods of modulating content signals are described in greater detail below.

In the various embodiments, the mark may be configured so that it does not protect the content signal 14 because it may not have data associated with it. Instead, the mark may act merely as a rights assertion mark, which asserts that rights are associated with the content signal. For example, in the various embodiments, information may be conveyed through the mere existence or absence of a mark within the content signal 14, such that the mark acts as a binary or other dual state indicator, where the absence of the mark indicates a first defined state and the presence of the mark indicates a second defined state.

The mark may further include information such as, for example, a web site address, or other identification data. For example, if the content signal 14 includes a motion picture production, the mark may include information that includes who owns the production, who bought a copy of the production, who produced the production, where the copy was purchased, or other similar data. The mark may further include a promotional opportunity (e.g., an electronic coupon), authentication data (e.g., that a user is authorized to receive the content signal 14), non-pictorial data, or other similar data. The mark may also be used to track content (e.g., the showing of commercials). The mark may also provide an indication of a presence of rights associated with the content signal 14, provide a promotional opportunity, provide electronic game play enhancement, be a uniform resource locator (URL), be an electronic coupon, provide an index to a database, or other similar data. Multiple messages may optionally be encoded in the content signal 14.

The mark may optionally include extra digital bits that enable error checking during decoding. For example, the extra bits may include parity bits used by the Reed-Solomon technique or Data Matrix for error checking, or extra bits that enable Manchester encoding. The use of the extra bits for error checking may enable transmission of the message unobtrusively within the content signal at low amplitude on noisy or cluttered frames.

The mark may assume various perceptible forms, including a recognizable symbol, shape, or other pattern that is capable of being matched and interpreted. For example, the mark may include a perceptible representation of a trademark or a logo. The mark may also include dots in a square array or a hexagonal array, although other types of regular and irregular patterns may also be used. In the various embodiments, the mark may be suitably encoded so that the arrangements of the bits in the frame correspond to a pattern that is capable of being matched or interpreted as one or more bar codes. The bar code may include a one-dimensional bar code pattern, such as a UPC bar code. The bar code may also include a multi-dimensional pattern, such as, for example, a two-dimensional bar code such as an Aztec code, Data Matrix, Dataglyph, MaxiCode, PDF417, QR Code, Ultra Code or UCC RSS-2D bar code, although other machine readable representations of data in a visual form may also be used.

Figure 2:
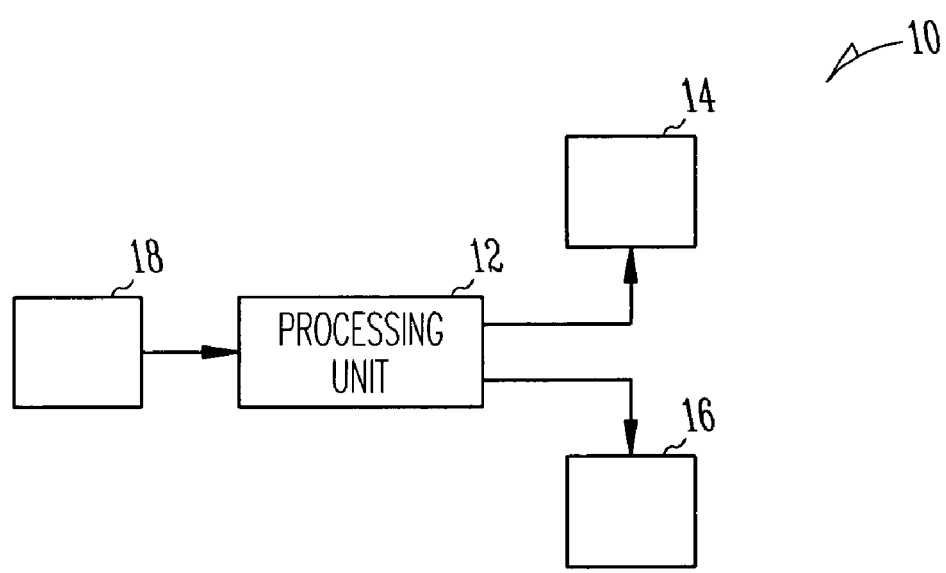
FIG. 2 is a diagrammatic block view of a processing system according to the various embodiments.

With continued reference to FIG. 1, and referring now also to FIG. 2, the processing unit 12 may be further configured to receive the encoded content signal 18 from a suitable storage device (not shown in FIG. 2) coupled to the processing unit 12, or from a communications network (also not shown in FIG. 2) coupled to the processing unit 12. The encoded content signal 18 may then be decoded into the corresponding content signal 14 and the supplemental data 16 by a decoding apparatus, which will also be described in greater detail below. The decoding apparatus may also be implemented in hardware, in firmware, partially in software, or entirely in software. The content signal 14 and the supplemental data 16 may then be suitably stored, or transferred to other processing units by means of a suitable communications system.

Although FIG. 1 and FIG. 2 show the processing unit 12 configured to provide both encoding and decoding functions, it is understood that the processing unit 12 may be configured to perform a selected one of the foregoing functions. For example, in the various embodiments, a first processing unit may be configured to provide the encoding function to generate the encoded content signal. The encoded content signal may then be communicated to a plurality of other processing units by means of a suitable communications system, wherein a selected one of the other processing units includes the decoding function. In other of the various embodiments, none of the other processing units may be configured to decode the encoded content signal, while the encoding processing unit is suitably configured to decode the encoded content signal.

Figure 3:
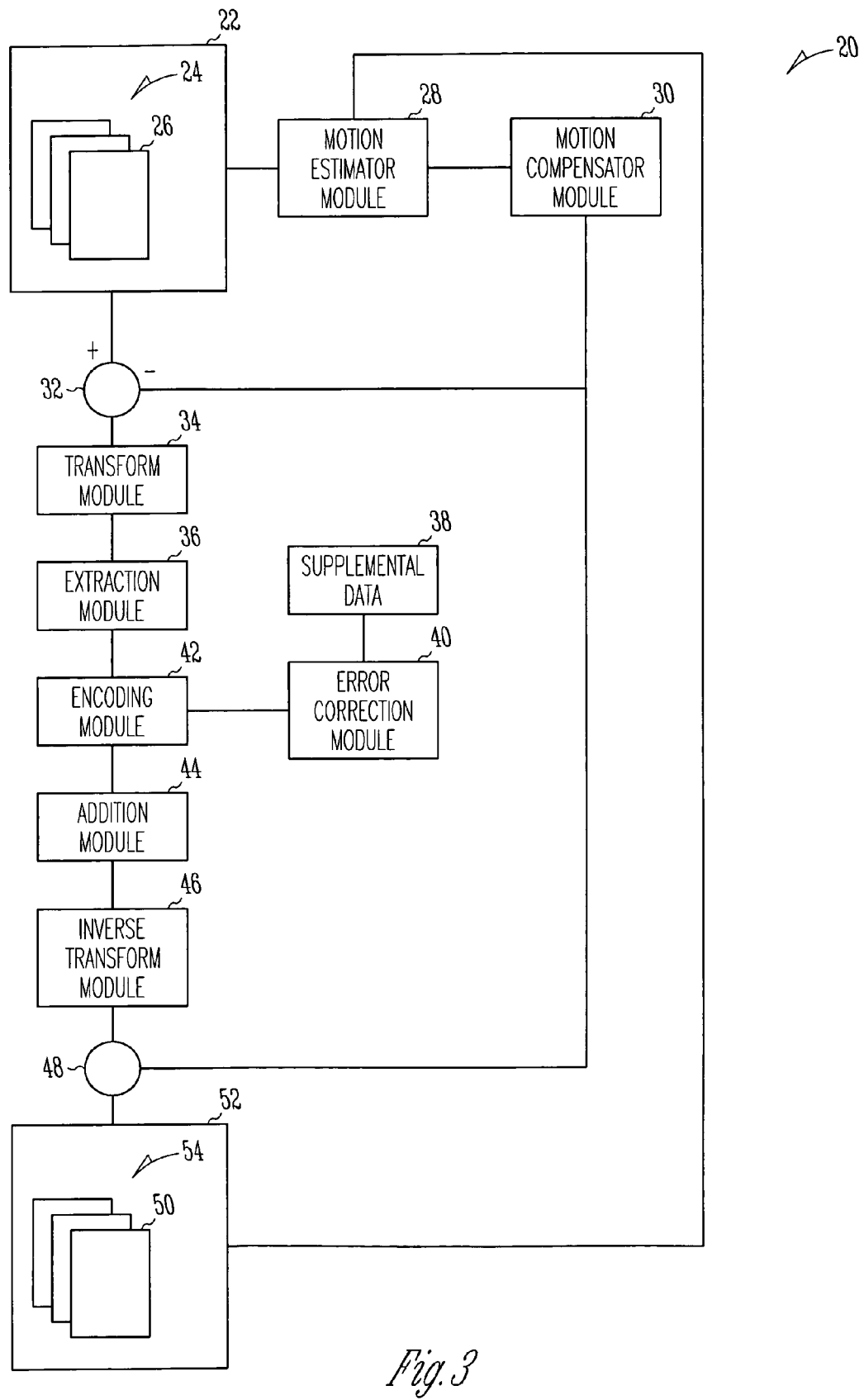
FIG. 3 is a diagrammatic block view of an encoding apparatus according to the various embodiments.

With reference now to FIG. 3, an encoding apparatus 20 according to the various embodiments will now be described. The encoding apparatus 20 may be executed by the processing unit 12 of FIG. 1 and FIG. 2, and may be implemented entirely in software, although the encoding apparatus 20 may also include any suitable combination of hardware, firmware or software modules. The encoding apparatus 20 may include a video frames extraction module 22 that is operable to receive a digital video file 24 that is operable to separate the digital video file 24 into discrete frames 26. For example, the video frames extraction module 22 may be configured to receive a file 24 that is provided in the audio-video interleave (AVI) format and the QuickTime movie format (MOV). The frames 26 may also be provided in the bitmap format (BMP) or Graphics Interchange Format (GIF). A selected one of the frames 26 may be transferred to a motion estimator module 28 that is configured to estimate a motion associated with the selected one of the frames 26 by generating one or more motion vectors associated with elements in the frame 26. For example, the elements may include pixels in the frame 26, although other elements in the frame 26 may also be used. The generated motion vectors may then be transferred to a motion compensator module 30 that generates a motion-compensated frame that includes the motion estimations based upon the vectors. The motion estimator module 28 and the motion compensator module 30 may be suitably configured to receive and process an intra-frame ("I-frame"), and a predicted frame ("P-frame"), although the bi-predictive ("B-frame") may also be used.

The selected frame 26 and the motion-compensated frame derived therefrom may be transferred to a summing unit 32 to form a difference frame by subtracting the motion-compensated frame from the selected frame 26. The difference frame may then be transferred to a transform module 34. The transform module 34 may be configured to perform a discrete wavelet transform (DWT), a discrete cosine transform (DCT), or other suitable transforms, so that a transformed frame is generated. For example, a Bi-Orthogonal 9/7 wavelet transform method may be used to generate the transformed frame. The transformed frame may then be transferred to an extraction module 36 that is operable to extract a predetermined portion of the transformed frame. In the various embodiments, the extraction module 36 is configured to extract an approximation band that includes lower level frequency components.

The encoding apparatus 20 is further configured to receive supplemental data 38 from a storage device coupled to the processing unit 12 (FIG. 1 and FIG. 2). In the various embodiments, the supplemental data 38 may include, for example, data for a digital mark, such as, for example, a digital watermark. The supplemental data 38 may also include metadata, or links to metadata, and may also include authentication data. The supplemental data 38 may also be used to detect alterations present in the digital video file 24 that may arise due to printing, scanning, compression, or other known processes that may be performed on the digital video file. The supplemental data 38 may then be transferred to an error correction module 40 that is operable to add parity bits for error correction, as is understood in the art. The error correction module 40 may be operable to implement, for example, a Reed Muller or a Reed Solomon error correction method, although other suitable error correction methods may also be used. For example, a Turbo error correction method, or still other known error correction methods may also be used. In any case, the suitably error-corrected supplemental data 38, and the predetermined portion of the transformed frame, generated in the extraction module 36, may be transferred to an encoding module 42 The encoding module 42 is operable to embed the suitably error-corrected supplemental data 38 into the transformed frame. In the various embodiments, the encoding module 42 may be configured to implement a quantized index modulation (QIM) method for embedding the error-corrected supplemental data 38 into the transformed frame. Accordingly, the encoding module 42 generates an intermediate encoded frame having the error-corrected supplemental data 38.

Still referring to FIG. 3, the encoding apparatus 20 may also include an addition module 44 that receives the encoded frame from the encoding module 42, and combines the encoded frame with the wavelet decomposed frame obtained from module 34. The combined result may then be transferred to an inverse transform module 46 that is configured to perform the inverse of the transformation performed in the transform module 34. For example, if the transform module 34 is configured to perform a two-level discrete wavelet transform (DWT), then the inverse transform module 46 may be configured to perform a corresponding two-level inverse discrete wavelet transform (IDWT). A summing module 48 is operable to combine the motion compensated frame generated at the motion compensator module 30 with the resulting frame from the inverse transform module 46. Accordingly, an encoded frame 50 is obtained that includes the supplemental data 38 in a generally non-perceptible form. The encoded frame 50 may include, for example, a digital watermark that is non-perceptibly present in the encoded frame. Since the digital video file 24 may include more than a single frame, a frame collection module 52 may be provided that collects the encoded frames 54 and processes the frames 54, if required, to configure the frames 54 for display on a suitable display device. Alternatively, the frames 54 may be configured for storage on a suitable storage device. Although the various modules of the encoding apparatus 20 have been described in detail, it is understood that various processing modules may also be present that are interposed between the foregoing modules, which may be configured to provide routine intermediate results, as one skilled in the art will readily understand. In the interest of clarity of description, and to focus on the pertinent novel portions of the various embodiments, these modules have not been described in detail.

In the foregoing description, the encoded content signal (e.g., the frames 54) may be provided to a broadcast source for distribution and/or transmission to an end-user of the broadcast content that may view the content associated with encoded content signal. The broadcast source may further deliver the encoded content signal to one or more viewers in formats including analog and/or digital video by storage medium such as DVD, tapes, and other fixed medium and/or by transmission sources such as television broadcast stations, cable, satellite, wireless and Internet sources that broadcast or otherwise transmit broadcast content. The encoded content signal may be encoded at the broadcast source prior to delivering the encoded content signal to the one or more viewers. Additional encoding (e.g., MPEG encoding) may occur at the encoding apparatus 20, the broadcast source, or at other locations in a production sequence following encoding.

Figure 4:
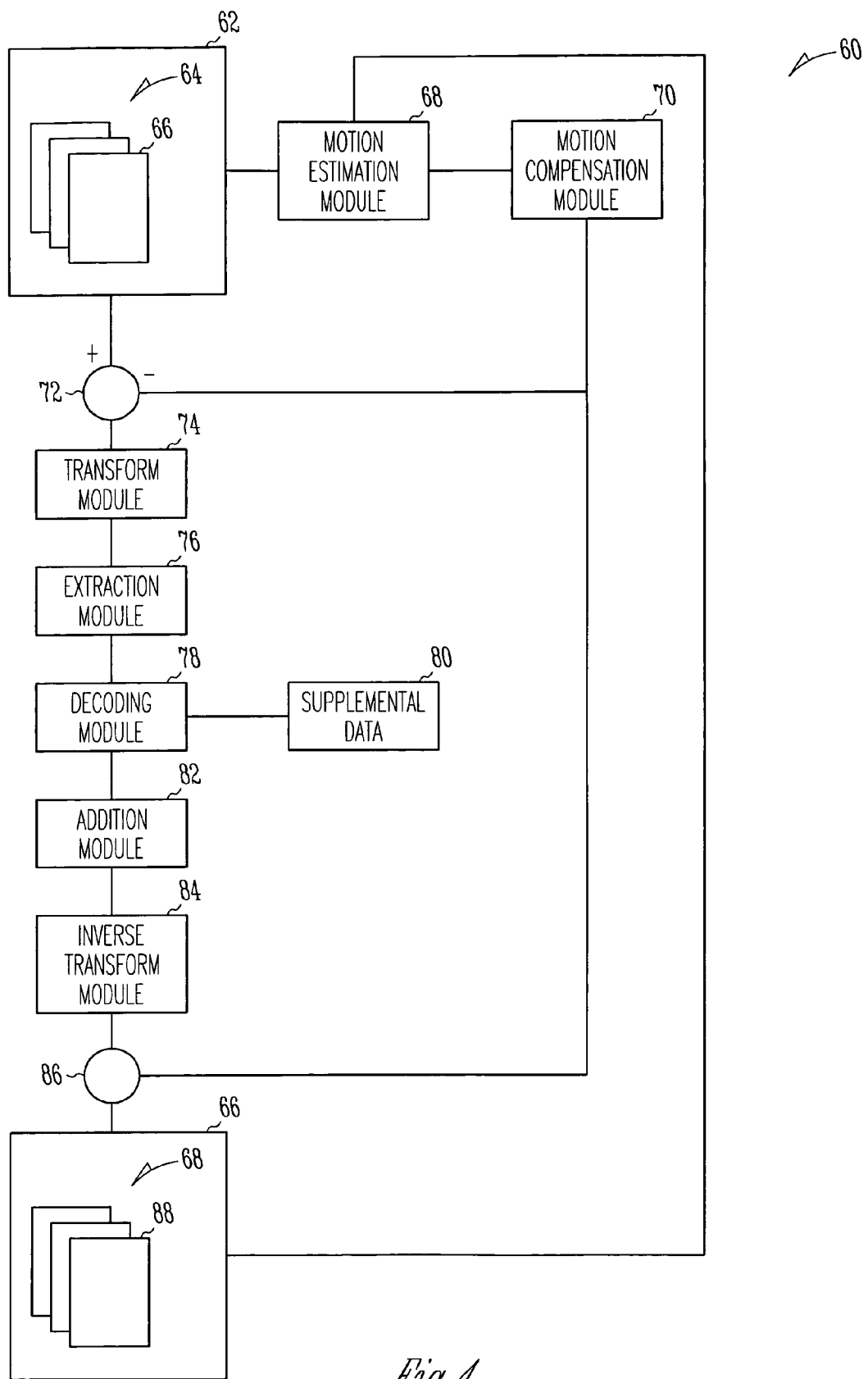
FIG. 4 is a diagrammatic block view of a decoding apparatus according to the various embodiments.

FIG. 4 is a diagrammatic block view of a decoding apparatus 60 according to the various embodiments. The decoding apparatus 60 may also be executed by the processing unit 12 of FIG. 1 and FIG. 2, and may also be implemented entirely in software, although the decoding apparatus 60 may also include any suitable combination of hardware, firmware or software modules. Furthermore, in the discussion that follows, various modules of the decoding apparatus 60 have been previously described in detail. Therefore, in the interest of brevity, these modules may not be described in detail. The decoding apparatus 60 may include an extraction module 62 that is operable to receive an encoded digital video file 64. The extraction module 62 separates the encoded digital video file 64 into discrete encoded frames 66. For example, the encoded digital video file 64 may include a digital mark (e.g., a watermark) that may be embedded into each of the encoded frames 66 by the encoding apparatus 20 of FIG. 3. A selected one of the encoded frames 66 may be transferred to a motion estimator module 68 that is configured to estimate a motion associated with the selected one of the encoded frames 66. The estimated motion, which may be in the form of vectors generated by the module 68 of FIG. 3, may then be transferred to a motion compensator module 70 that generates a motion compensated frame that includes the foregoing motion estimations. Again, the motion estimator module 68 and the motion compensator module 70 may be suitably configured to receive and process an intra-frame ("I-frame"), and a predicted frame ("P-frame"), although the bi-predictive ("B-frame") may also be used.

The selected encoded frame 66 and the motion compensated frame derived from the motion compensation module 70 may be transferred to a summing unit 72 to form an encoded difference frame by subtracting the motion compensated frame from the selected encoded frame 66. The encoded difference frame may then be transferred to a transform module 74. The transform module 74 may perform a discrete wavelet transform (DWT), a discrete cosine transform (DCT), or other suitable transforms. In the various embodiments, a Bi-Orthogonal 9/7 wavelet transform method may be used to generate a transformed encoded frame. The transformed encoded frame may then be transferred to an extraction module 76 that is operable to extract a predetermined portion of the transformed encoded frame. In the various embodiments, the extraction module 76 is again configured to extract an approximation band.

The decoding apparatus 60 further includes a decoding module 78 that receives the extracted portion of the transformed encoded frame. In the various embodiments, the decoding module 78 implements a maximum likelihood-based estimation for error-corrected supplemental data followed by a soft decoding algorithm, such as a Hadamard transform algorithm, although other suitable transform algorithms may also be used. As a result, supplemental data 80, which was previously embedded in the encoded frames 66 may be recovered and provided to a separate data file. An addition module 82 receives the decoded frame from the decoding module 78, and combines the decoded frame with the wavelet decomposed frame obtained from module 74. The combined result may be transferred to an inverse transform module 84 that is configured to perform the inverse of the transformation performed in the transform module 74. In the various embodiments, the inverse transform module 84 may be configured to perform an inverse discrete wavelet transform (IDWT), although other inverse transform methods may also be used.

A summing module 86 may combine the motion compensated frame generated at the motion compensator module 70 with the resulting frame from the inverse transform module 84. As a result, a decoded frame 88 is generated. A frame collection module 89 may be provided that collects the decoded frames 88 and processes the frames 88, if required, to configure the frames 88 for display on a suitable display device. Alternatively, the frames 88 may be configured for storage on a suitable storage device. Although the various modules of the encoding apparatus 60 have been described in detail, it is understood that various processing modules may also be present that are interposed between the foregoing modules, which may provide routine intermediate results, as one skilled in the art will readily understand. In the interest of clarity in description, however, these modules have not been described in detail.

Figure 5:
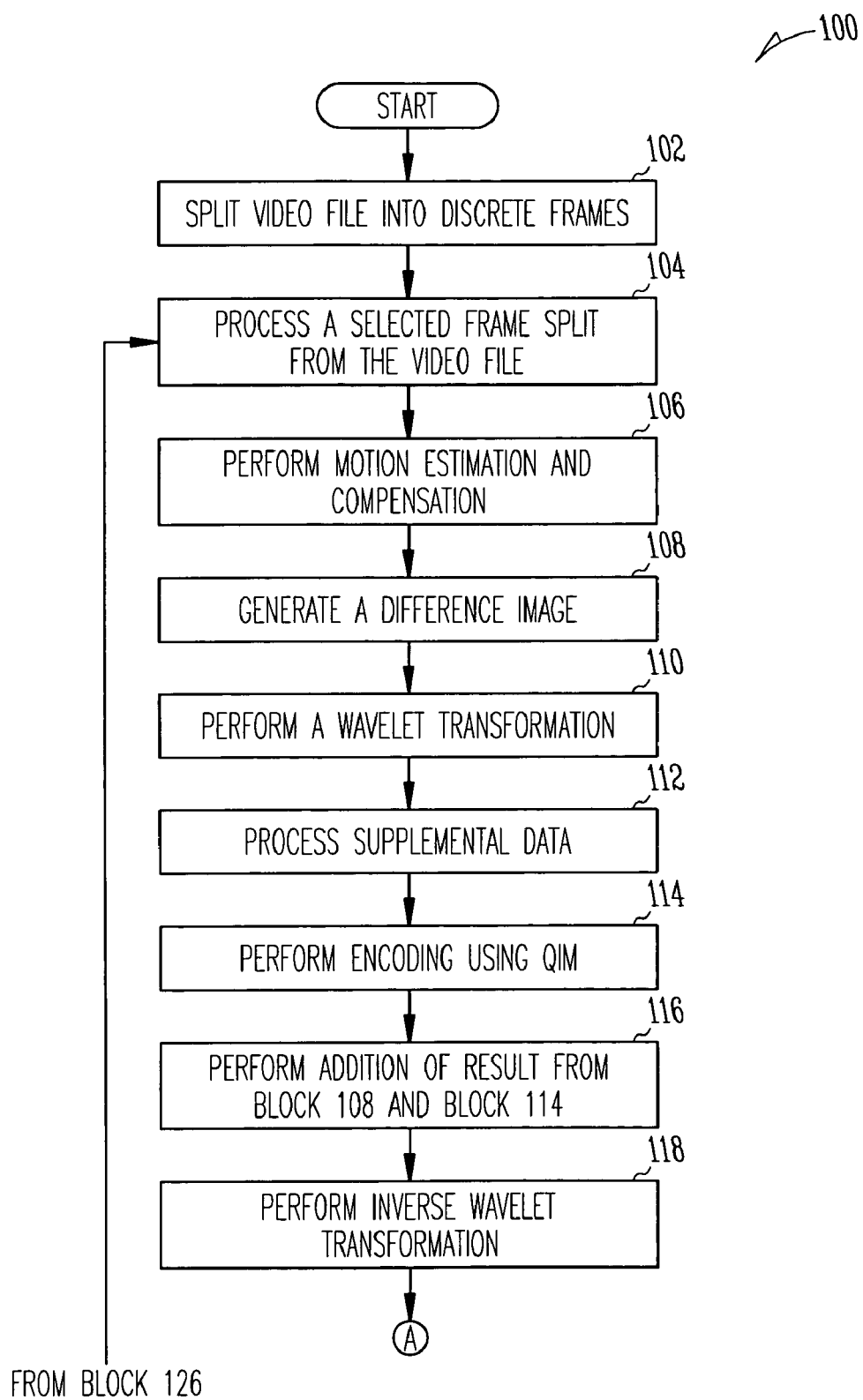
FIG. 5 is a flowchart that illustrates a method of encoding a digital signal content according to the various embodiments.
Figure 5:
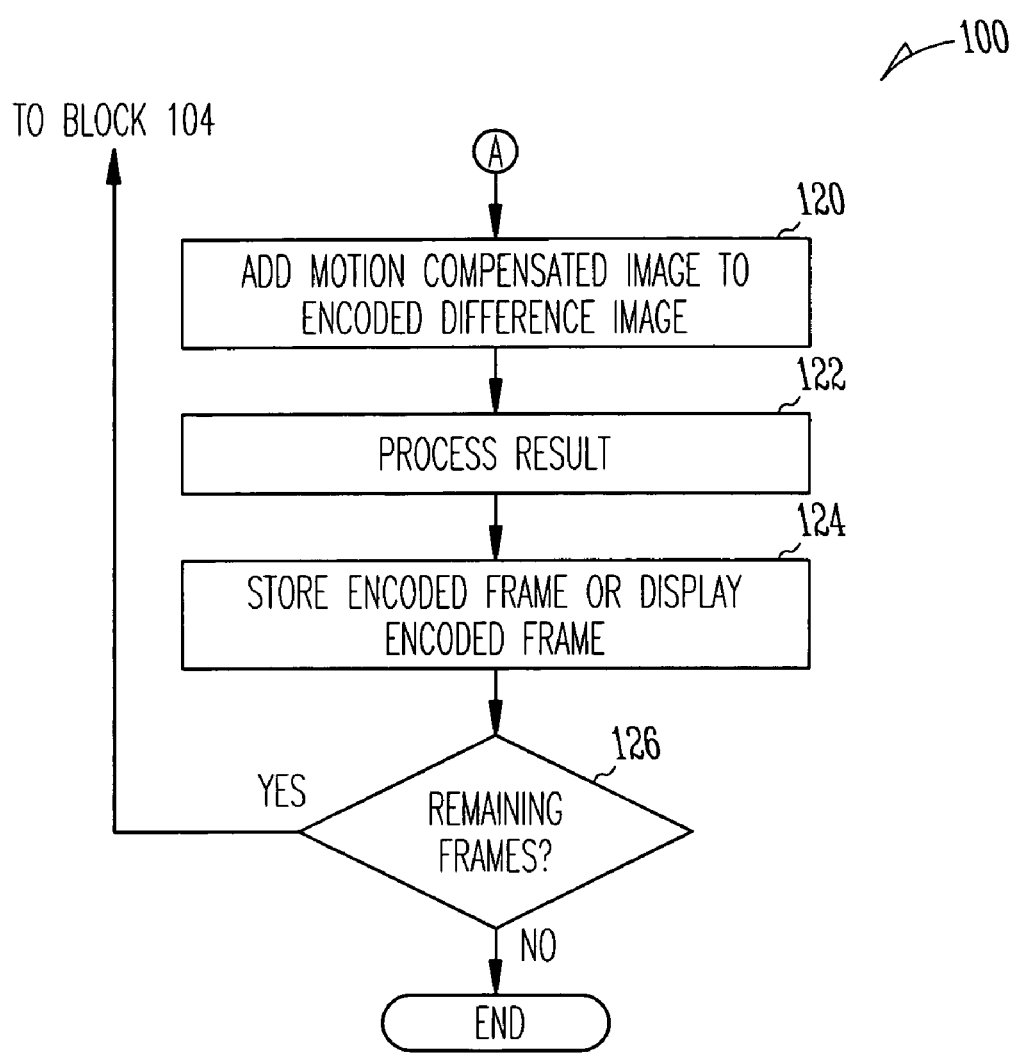

FIG. 5 is a flowchart that describes a method 100 of encoding a digital signal content, according to the various embodiments. At block 102, a video file is split into a plurality of discrete frames. In accordance with the various embodiments, the video file may be formatted in the audio-video interleave (AVI) format, or a QuickTime (MOV) while the frames are provided in the bitmap format (BMP), or a Graphics Interchange format (GIF). At block 104, a selected frame may be processed. The processing may include, for example, converting the elements, which may include pixels in the selected frame, from a Red-Green-Blue (RGB) color model to a luminance-chrominance model (YUV). One or more of the YUV components may then be selected for embedding the supplemental data. In the various embodiments, the supplemental data may include data for a digital mark, such as a digital watermark, although data that is suited for other purposes may also be included in the supplemental data for subsequent encoding. At block 106, motion estimation and motion compensation may be performed on the selected frame. In block 106, one of an I-frame and a P-frame may be used, although the B-frame may also be used. In general terms, motion estimation may be accomplished by generating a vector that is associated with frame elements, such as pixels, for example, that estimate relative motion between successive frames. Accordingly, a motion compensated frame is generated. At block 108, a difference frame is generated by forming a difference between the selected frame and the motion compensated frame. At block 110, a two-level (or higher) wavelet transform is performed on the difference frame. In the various embodiments, a Bi-orthogonal 9/7 transform may be used, although other suitable alternatives exist. Additionally, a portion of the transformed difference frame is extracted. In the various embodiments, the extracted portion may include an approximation band, or "LL-band".

Still referring to FIG. 5, at block 112, the supplemental data is processed. The processing may include the implementation of an error correction method, which may include, for example, a Reed Muller or a Reed Solomon error correction method. In the various embodiments, still other error correction methods may be used, which may include a Turbo error correction method, or still other known error correction methods. At block 114, the suitably processed supplemental data is encoded into the transformed difference frame. The encoding may be performed using a quantized index modulation (QIM) algorithm, although other suitable algorithms may also be used. At block 116, the difference frame generated at block 108 may be added to the result of block 114. At block 118, an inverse wavelet transform is performed on the result generated by block 116. At block 120, the motion compensated frame at block 106 is added to the encoded difference frame obtained from the inverse wavelet transform performed at block 118. At block 122, the result of block 120 may be subjected to further processing, which may include converting the YUV formatted frame to an RGB formatted frame, although other routine processing may also be performed. At block 124, the encoded frame may be stored in a suitable storage location, or may be accessed on a display device. At block 126, the method 100 may return to block 104 to process still other of the frames separated at block 102. The method 100 may therefore be continued until all of the frames are processed. The suitably encoded frames may also be collected and further processed to permit display of the collected frames on a video display device.

Figure 6:
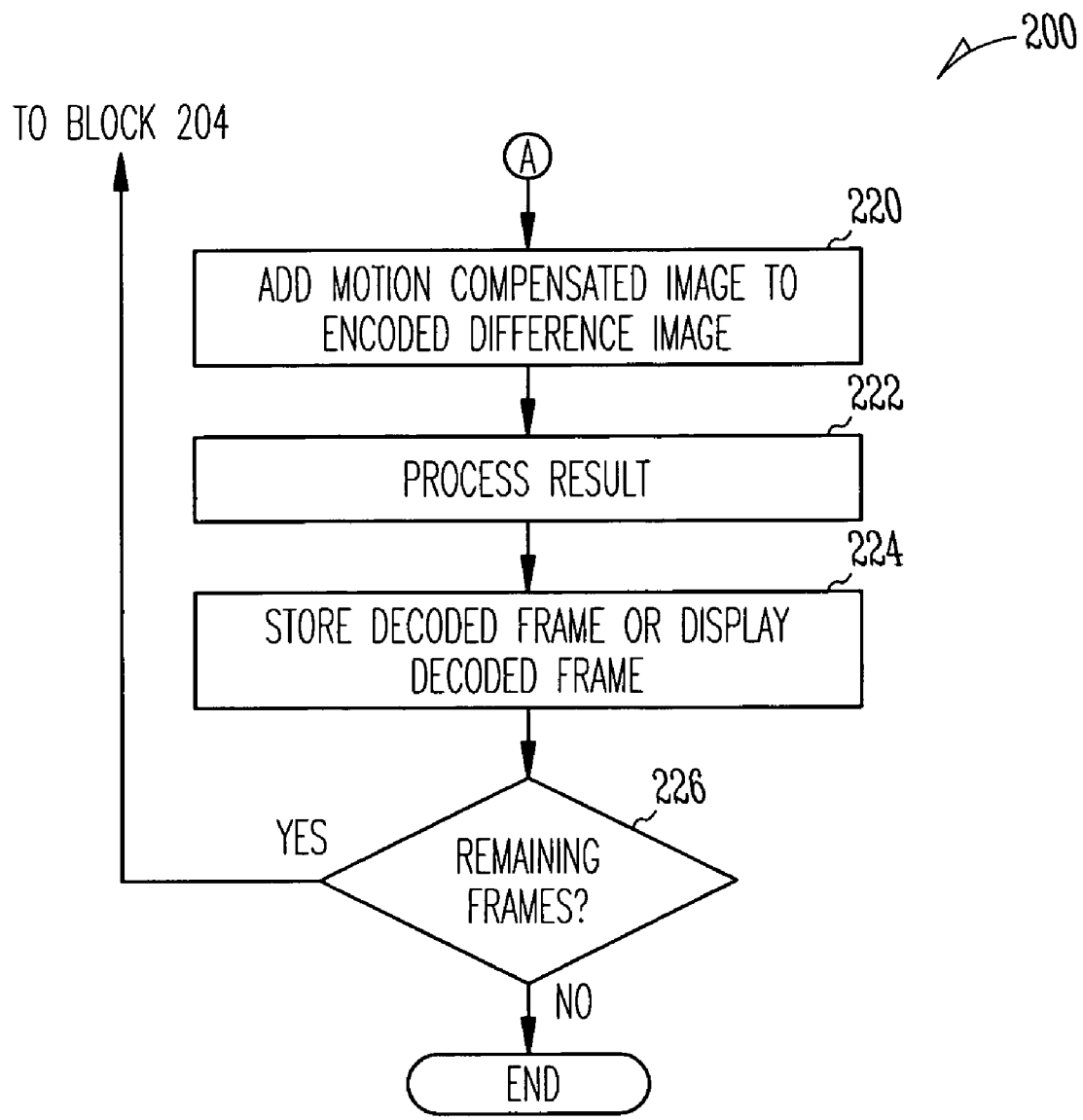
FIG. 6 is a flowchart that illustrates a method of decoding a digital signal content according to the various embodiments.

FIG. 6 is a flowchart that describes a method 200 of decoding a digital signal content, according to the various embodiments. In the description that follows, many of the blocks in the method 200 have been described in detail in connection with previous embodiments. Therefore, in the interest brevity, these blocks may not be described in further detail. At block 202, an encoded video file may be split into a plurality of discrete encoded frames. The encoded frames may include a digital mark, such as a digital watermark, or other desired data. The encoded video file may include a file formatted in the audio-video interleave (AVI) format, or a QuickTime movie format (MOV), while the encoded frames are provided in the bitmap format (BMP), or a Graphics Interchange Format (GIF). At block 204, a selected encoded frame may be processed, which may include converting the elements (e.g., one or more pixels) in the selected encoded frame from a Red-Green-Blue (RGB) color model to a luminance-chrominance model (YUV), as is known in the art. Accordingly, the one or more of the YUV components that were selected in the encoding process (at block 104 of FIG. 5) are identified.

At block 206, motion estimation and motion compensation may be performed on the selected encoded frame. As previously discussed, the selected encoded frame may include one of an I-frame and a P-frame, although the B-frame may also be used. The motion estimation is accomplished by generating a vector that is associated with each pixel to estimate a relative motion between successive encoded frames, so that a motion compensated frame is generated. At block 208, a difference frame is generated by forming a difference between the selected encoded frame and the motion compensated frame. At block 210, a two-level (or higher) wavelet transform may be performed on the difference frame generated at block 208. In the various embodiments, a Bi-orthogonal 9/7 transform may be used, although other suitable alternatives exist. At block 210, a portion of the transformed difference frame is also extracted. In the various embodiments, the extracted portion may include an approximation band, or "LL-band".

At block 212, the data encoded in the selected encoded frame is extracted. The data may be extracted using a cosine decoder followed by a soft decoding algorithm, such as a Hadamard transform algorithm, or other similar algorithms, and thereafter, an unmarked LL-band may be reconstructed and/or estimated. At block 214, the extracted data may be stored, if desired. At block 216, the difference frame generated at block 208 may be added to the result of block 212. At block 218, an inverse wavelet transform is performed on the result generated by block 216. At block 220, the motion compensated frame generated at block 206 is added to the decoded difference frame obtained from the inverse wavelet transform performed at block 218. At block 222, the result of block 220 may be subjected to further processing, which may include converting the YUV formatted frame to an RGB formatted frame, although other routine processing may also be performed. At block 224, the decoded frame may be stored in a suitable storage location, or may be accessed on a display device. At block 226, the method 200 may return to block 204 to process still other of the frames separated at block 202. The method 200 may therefore be continued until all of the frames are processed.

While the various embodiments of the invention have been illustrated and described, as noted above, many changes can be made without departing from the scope of this disclosure. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A processing system operable to encode selected data into digital video content, comprising:
   a motion estimator module operable to receive a video frame of the digital video content and to generate one or more motion vectors based upon selected elements in the video frame;
   a motion compensator module coupled to the motion estimator that generates a motion-compensated frame based upon the one or more motion vectors generated by the motion estimator;
   a first summing unit operable to receive the video frame and the motion compensated frame and to form a difference frame by subtracting the motion-compensated frame from the video frame;
   a transform module operable to receive the difference frame and to generate a transformed frame by applying a predetermined transform to the difference frame;
   an extraction module operable to receive the transformed frame and configured to remove a predetermined portion of the difference frame;
   an encoding module that is operable to introduce the selected data into the predetermined portion of the difference frame to define an intermediate encoded frame;
   an addition module operable to receive the intermediate encoded frame and configured to add the intermediate encoded frame and the transformed frame to define a combined frame;
   an inverse transform module that is operable to receive the combined frame and generate an inverse-transformed frame by applying a predetermined inverse transform to the combined frame; and
   a second summing unit operable to receive the inverse-transformed frame and to combine the inverse-transformed frame and the motion-compensated frame to generate an encoded frame.

2. The processing system of claim 1, comprising a video frame extraction module operable to receive a digital video file and to separate the digital video file into discrete video frames.

3. The processing system of claim 1, wherein the transform module is configured to perform one of a discrete wavelet transform (DWT), a discrete cosine transform (DCT), and a bi-orthogonal 9/7 transform.

4. The processing system of claim 1, wherein the inverse transform module is configured to perform one of an inverse discrete wavelet transform (IDWT), an inverse discrete cosine transform, and an inverse bi-orthogonal 9/7 transform.

5. The processing system of claim 1, wherein the extraction module is configured to extract an approximation band that includes low frequency components from the difference frame.

6. The processing system of claim 1, comprising an error correction module configured to introduce error correction data into the selected data.

7. The processing system of claim 6, wherein the error correction module is configured to implement one of a Reed-Muller error correction method and a Reed-Solomon error correction method.

8. The processing system of claim 1, wherein the encoding module is configured to implement a quantized index modulation (QIM) algorithm to introduce the selected data into the predetermined portion of the difference frame.

9. The processing system of claim 1, comprising a frame collection module that is operable to receive successive and discrete encoded frames, and to assemble the encoded frames into an encoded digital video file.

10. The system of claim 9, wherein frame collection module outputs the encoded digital video file to a broadcast source to deliver to viewers.

11. The system of claim 10, wherein the encoded frame comprises a digital watermark.

12. The system of claim 11, comprising an additional encoder to further encode the encoded digital file.

13. The system of claim 12, wherein the encoding module is to encode data into audio associated with the frame.

14. The system of claim 13, wherein the transform module is to generate a wavelet transformed frame and wherein the addition module is to add the intermediate encoded frame and the wavelet transformed frame to define the combined frame.

15. The processing system of claim 1, wherein the encoded frame comprises a digital watermark.

16. The system of claim 1, wherein the encoding module is to encode data into audio associated with the frame.

17. The system of claim 1, wherein the transform module is to generate a wavelet transformed frame and wherein the addition module is to add the intermediate encoded frame and the wavelet transformed frame to define the combined frame.

18. A method of encoding selected data into digital video content, comprising:

selecting a discrete video frame from the digital video content;
performing a motion estimation on the video frame to generate one or more motion vectors based upon selected elements in the video frame;
generating a motion compensated frame based upon the one or more motion vectors;
generating a difference frame based upon the video frame and the motion compensated frame by subtracting the motion-compensated frame from the video frame;
performing a transformation on the difference frame to generate a transformed frame;
performing an extraction on the transformed frame to remove a predetermined portion of the difference frame;
encoding the selected data into a portion of the transformed difference frame to form an intermediate encoded frame;
combining the transformed difference frame and the intermediate encoded frame to form a combined frame;
performing an inverse transformation on the combined frame;
combining the motion compensated frame and the inverse-transformed combined frame to generate an encoded frame.

19. The method of claim 18, wherein performing a transformation on the difference frame comprises performing one of a discrete wavelet transform (DWT), a discrete cosine transform (DCT), and a bi-orthogonal 9/7 transform on the difference frame.

20. The method of claim 18, wherein encoding the selected data into the transformed difference frame comprises encoding the data using a quantized index modulation algorithm.

21. The method of claim 18, wherein performing an inverse transformation on the combined frame comprises performing one of an inverse discrete wavelet transform (IDWT), an inverse discrete cosine transform, and an inverse bi-orthogonal 9/7 transform on the combined frame.

22. The method of claim 18, wherein encoding module includes encoding data into audio associated with the frame.

23. The method of claim 18, wherein combining includes outputting a encoded digital video file to a broadcast source to deliver to viewers.

24. The method of claim 23, wherein outputting includes outputting the encoded frame with a digital watermark.

25. The method of claim 24, wherein outputting includes further encoding the encoded digital file.

26. The method of claim 25, wherein the encoding module is to encode data into audio associated with the frame.

27. The method of claim 26, wherein transforming includes generating a wavelet transformed frame as the intermediate encoded frame.

28. The method of claim 18, wherein transforming includes generating a wavelet transformed frame as the intermediate encoded frame.

* * * * *